United States Patent
Buekers et al.

[11] Patent Number: 5,907,125
[45] Date of Patent: May 25, 1999

[54] ENVIRONMENTAL PROTECTION

[75] Inventors: Valere Buekers, Zelen-Halen; Roger Delvaux, Kessel-Lo; Marc Demesmaeker, Antwerpen, all of Belgium

[73] Assignee: N.V. Raychem S.A., Kessel-Lo, Belgium

[21] Appl. No.: 08/628,658

[22] PCT Filed: Sep. 21, 1994

[86] PCT No.: PCT/GB94/02049

§ 371 Date: Aug. 29, 1996

§ 102(e) Date: Aug. 29, 1996

[87] PCT Pub. No.: WO95/10133

PCT Pub. Date: Apr. 13, 1995

[30] Foreign Application Priority Data

Oct. 7, 1993 [GB] United Kingdom ............... 9320704
Jul. 8, 1994 [GB] United Kingdom ............... 9413811

[51] Int. Cl.$^6$ ................................................. H05K 5/02
[52] U.S. Cl. ........................................ 174/52.1; 174/17 CT
[58] Field of Search ................................. 174/52.3, 52.1,
174/50, 17 CT, 255; 220/3.8, 3.92, 3.94,
4.02; 277/227, 207 R, DIG. 6; 361/679,
739, 757

[56] References Cited

U.S. PATENT DOCUMENTS

| | | | |
|---|---|---|---|
| 4,505,403 | 3/1985 | Bowden, Jr. et al. | 220/242 |
| 4,694,555 | 9/1987 | Russell et al. | 174/52.1 X |
| 4,718,678 | 1/1988 | Vansant | 277/DIG. 6 X |
| 4,770,641 | 9/1988 | Rowlette | 439/86 |
| 5,155,660 | 10/1992 | Yamada et al. | 361/386 |
| 5,206,460 | 4/1993 | Yang | 174/52.1 |
| 5,239,446 | 8/1993 | Matsumura et al. | 174/52.3 X |
| 5,268,814 | 12/1993 | Yakubowski | 174/52.3 X |
| 5,317,921 | 6/1994 | Kremidas | 73/721 |
| 5,334,799 | 8/1994 | Naito et al. | 174/52.1 X |
| 5,386,342 | 1/1995 | Rostoker | 174/52.3 X |
| 5,536,972 | 7/1996 | Kato | 257/706 |

FOREIGN PATENT DOCUMENTS

| | | | |
|---|---|---|---|
| 0 299 797 A2 | 1/1989 | European Pat. Off. | |
| 2 050 932 | 4/1972 | Germany . | |
| 4346498 | 12/1992 | Japan | 361/757 X |
| 653674 | 2/1994 | Japan | 174/52.1 X |
| 2 106 337 | 4/1983 | United Kingdom | H01R 13/52 |
| 2190795 | 11/1987 | United Kingdom | 174/52.1 X |
| 90/07212 | 6/1990 | WIPO | H02G 3/18 |
| 92/05603 | 4/1992 | WIPO | H01R 4/60 |
| 93/11586 | 6/1993 | WIPO | H01R 13/52 |

Primary Examiner—Kristine L. Kincaid
Assistant Examiner—Dean A. Reichard
Attorney, Agent, or Firm—Herbert G. Burkard

[57] ABSTRACT

A device for environmental protection of an electrical component on a mount, e.g. a circuit board, includes: a first housing part; a second housing part which together with the first housing part provides a substantially closed housing; a mount (e.g. a circuit board) for an electrical component that may be movably secured with respect to the first housing part; and a sealing material positioned between the mount and a surface of the first housing part; such that the mount can be moved with respect to the first housing part to put the sealing material under compression. The device can also include a maintenance termination unit for a telecommunications network.

12 Claims, 5 Drawing Sheets

ENVIRONMENTAL PROTECTION

BACKGROUND OF THE INVENTION

The present invention relates to a device for providing environmental protection around electrical connectors, components or circuitry.

In particular, the invention provides a device comprising a network termination module that preferably contains a so-called maintenance termination unit or MTU. Such units are often provided in a telecommunications network between that part which is the responsibility of the telephone company and that part which is the responsibility of the subscriber. The module serves as a demarcation point and allows remotely-activated disconnection and testing.

Such modules generally need to provide protection from the environment in order that they may be positioned in unfavourable locations for example on an external wall of a building. Such environmental protection can prevent moisture or other contaminants from damaging electrical connectors, components and circuitry.

SUMMARY OF THE INVENTION

According to a first aspect of the invention, there is provided a device for environmental protection of an electrical component on a mount, which comprises:

a first housing part;

a second housing part which together with the first housing part provides a substantially closed housing;

a mount for an electrical component that may be movably secured with respect to the first housing part; and a sealing material positioned between the mount and a surface of the first housing part;

such that the mount can be moved with respect to the first housing part to put the sealing material under compression.

The fact that the sealing material may be put under compression by moving the mount with respect to the first housing part has an advantage in that mere movement of the mount may improve the sealing characteristics of the sealing material or it may transform the sealing material from a state in which it can not form an effective seal into a state in which it can form an effective seal. This is particularly applicable to embodiments of the invention which use gel or a gel-like substance as the sealing material, since such materials often perform best when they are placed under compression. Such compression may, advantageously, be applied to the sealing material in a way which accommodates creepage due to temperature fluctuations or due to the applied compression itself, while keeping the sealing material under compression. For example, one or more resiliently biassing means, e.g. springs, may be provided, or such resilient biassing may be provided by the material of the housing or by the mount for the electrical component.

Preferably the movement of the mount with respect to the first housing part causes displacement of sealing material to a position where it can form a seal between the first and second housing parts. This has an advantage in that the formation of the seal between the first and second housing parts may occur substantially automatically upon movement of the mount with respect to the first housing part. This may, for example, enable the sealing material to be retained in a position in which it is protected from damage or contamination while a technician works on the mount and only to be displaced into a sealing position when the device is re-closed. More preferably, the displacement of the sealing material comprises formation of a bead of sealing material between a wall of the first housing part and the mount. Most preferably, the sealing material is displaced such that a substantially continuous bead of material is formed around the mount, between the mount and a wall of the first housing part which may be contacted by the second housing part to form a continuous seal between the first and second housing parts.

The mount for an electrical component preferably comprises a circuit board, especially a printed circuit board.

According to a preferred embodiment of the invention, the device further comprises one or more supports for the mount, which project from the said surface of the first housing part, the supports being constructed to allow the mount to be moved with respect to, preferably towards, and more preferably towards and away from, the said surface of the first housing part to put the sealing material under compression. The support or supports may, for example, advantageously prevent lateral movement (including rotation) of the mount with respect to the first housing part which could otherwise prevent the formation of a continuous bead around the mount and hence reduce the effectiveness of the seal. Preferably the support(s) project(s) through the sealing material. Preferably the device comprises one or more stop means to limit the movement of the mount towards the said surface of the first housing part. Each support may advantageously comprise a relatively narrow end portion which is shaped to extend into an opening through the mount and to allow the movement of the mount towards the surface of the first housing part, and a relatively wide portion between the end portion and the surface of the first housing part which is shaped to limit the movement of the mount towards the surface of the first housing part, for example by abutting the mount. The fact that, in this preferred embodiment of the invention, the or each support limits the amount of movement of the mount towards the surface of the first housing part has an advantage in that it can prevent the sealing material being put under too great a compression which could otherwise result in poor sealing performance. In addition, the supports may be shaped appropriately so that the mount may move towards the surface of the first housing part just the correct distance to provide the correct amount of displacement of the sealing material to form an optimum seal.

In a particularly preferred embodiment of the invention, the movement of the mount with respect to the first housing part to put the sealing material under compression is caused by bringing the first and second housing parts together. This has an advantage in that normally an effective seal is formed substantially automatically upon closing the housing of the device.

The device in the absence of the mount is novel and inventive per se. According to a second aspect of the invention, therefore, there is provided a device for environmental protection of an electrical component on a mount, which comprises:

a first housing part;

a second housing part which together with the first housing part provides a substantially closed housing;

a sealing material positioned on a surface in the first housing part; and one or more supports for the mount, which project(s) from the said surface of the first housing part; and one or more stop means to separate the mount from the said surface of the first housing part.

Preferably, the supports are constructed to allow the mount to be moved towards the first housing part, and the or each stop means is constructed to limit such movement. More preferably, the support, or at least one of the supports, comprises a relatively narrow end portion, and the, or at least one of the, stop means comprises a relatively wide portion of the support(s) between the end portion and the said surface of the first housing part.

In one embodiment, the device according to either aspect of the invention may have at least two parts, one of which is semi-permanently sealed such that access is only possible with special tools, and preferably only by the telephone company, and another part which can be opened by a subscriber in order to connect or disconnect his telephone or other equipment. In another embodiment, the device may be formed such that the entire device can be opened by opening a single cover part to allow access to the electrical component(s) contained therein. Either embodiment of the device may contain over-voltage and/or over-current protection circuitry.

Environmental protection may be provided by a suitably shaped housing, preferably in conjunction with a gel, mastic, adhesive or other suitable sealing material. We prefer that a gel be used, and preferably a material characterised by a cone penetration value (according to ASTM D217) of at least 50 ($10^{-1}$ mm), more preferably at least 100 ($10^{-1}$ mm), even more preferably at least 150 ($10^{-1}$ mm) and preferably no greater than 400 ($10^{-1}$ mm), especially no greater than 350 ($10^{-1}$ mm). Preferably the gel has a hardness at room temperature as determined using a Stevens-Volland Texture Analyser of greater than 45 g, particularly greater than 50 g especially greater than 55 g, e.g. between 55 g and 60 g. It preferably has a stress-relaxation of less than 12%, particularly less than 10% and especially less than 8%. Ultimate elongation, also at room temperature, is preferably greater than 60%, especially greater than 1000%, particularly greater than 1400%, as determined according to ASTM D638. Tensile modulus at 100% strain is preferably at least 1.8 MPa more preferably at least 2.2 MPa. In general compression set will be less than 35%, especially less than 25%. The material preferably also has a maximum tensile strength of approximately 20 p.s.i., and preferably a cohesive strength greater than its adhesive strength. The gel may comprise, for example, silicone gel, urea gel, urethane gel, or any suitable gel or gelloid sealing material. Preferred gels comprise an oil-extended polymer composition. Such gels are preferably pre-cured (which term, in the case of block copolymers and other such materials, includes the physical rather than chemical formation of a three-dimensional structure) before the gel is displaced into contact with the component that it is to protect. Such materials, and their method of use, are disclosed in, for example, U.S. Pat. No. 4,600,261, and U.S. Pat. No. 4,634,207, the disclosures of which are incorporated herein by reference.

The polymer composition of the gel may for example comprise an elastomer, or a block copolymer having relatively hard blocks and relatively elastomeric blocks. Examples of such copolymers include styrene-diene block copolymers, for example styrene-butadiene or styrene-isoprene diblock or triblock copolymers, or styrene-ethylene-butylene-styrene triblock copolymers as disclosed in international patent publication number WO88/00603. Preferably, however, the polymer composition comprises one or more styrene-ethylene-propylene-styrene block copolymers, for example as sold under the Trade Mark SEPTON by Kuraray of Japan. The extender liquids employed in the gel preferably comprise oils conventionally used to extend elastomeric materials. The oils may be hydrocarbon oils, for example paraffinic or naphthenic oils, synthectic oils for example polybutene or polypropene oils, and mixtures thereof. The preferred oils are mixtures of non-aromatic paraffins and naphthenic hydrocarbon oils. The gel may contain additives such as moisture scavengers (eg. Benzoyl chloride), antioxidants, pigments and fungicides.

From the above description it is to be understood that the device according to either aspect of the invention preferably provides environmental protection for at least one electrical component on a mount, preferably in the form of a circuit board, e.g. a printed circuit board, by means of gel, especially in the form of a layer of gel covering substantially the entire internal surface of the first housing part (or at least that portion of the first housing part which can be opened by the telephone subscriber). The circuit board or other mount is preferably moved towards the internal surface of the first housing part automatically upon closing the device with the second housing part, thereby displacing some of the gel to form a bead around at least part (preferably all) of the circuit board between the circuit board and a wall of the first housing part. The circuit board is preferably prevented from moving towards the internal surface of the first housing part by more than a preselected amount by means of one or more supports projecting from the internal surface, which preferably project through the gel and through one or more openings in the circuit board.

BRIEF DESCRIPTION OF THE DRAWINGS

The invention is further illustrated, by way of example, with reference to the accompanying drawings, in which.

DESCRIPTION OF THE PREFERED EMBODIMENTS

Figure 1:
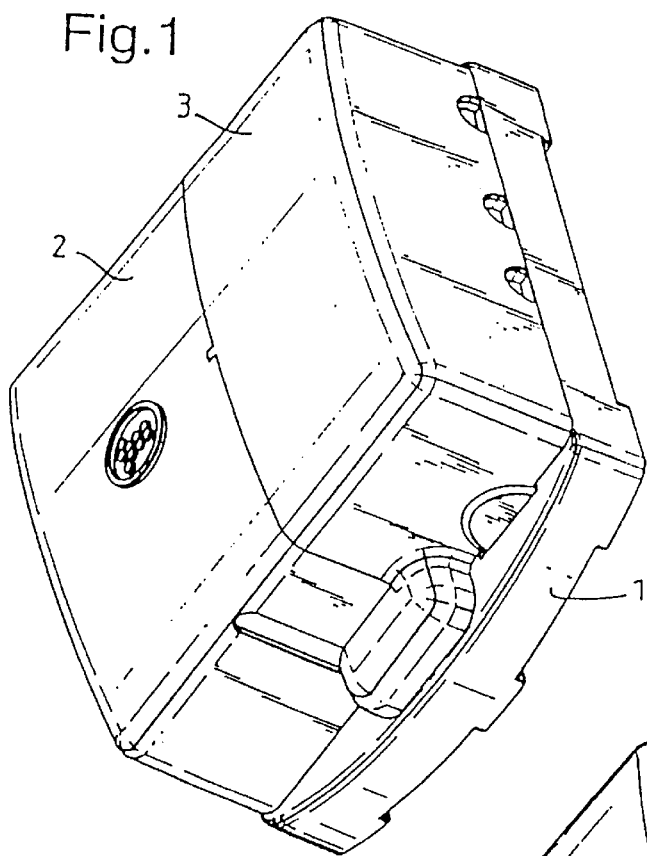
FIG. 1 shows a device according to the invention in the form of a network termination module in perspective view with its cover closed.

A module of FIG. 1 comprises a base (or first housing part) 1 which may be attached to a wall, and a semi-permanently attached first cover 2, and a removable second cover 3 (or second housing part).

Figure 2:
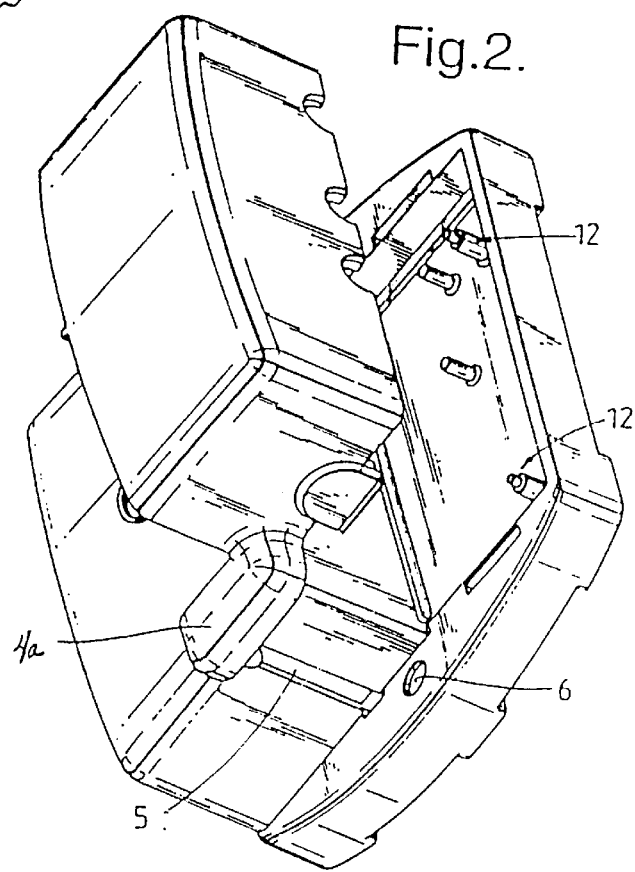
FIG. 2 shows a similar module with its cover open.
Figure 3:
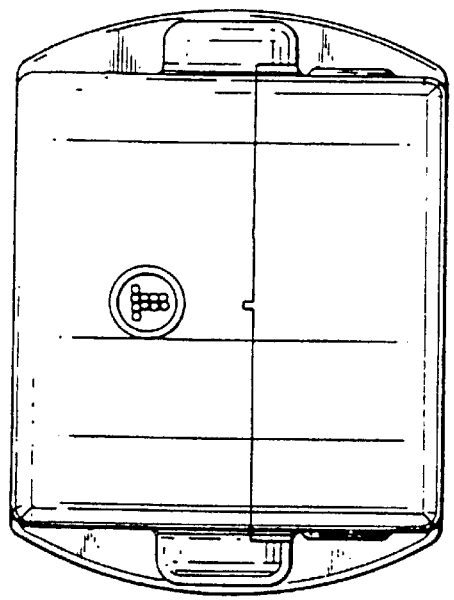
FIGS. 3 to 8 show various sectional views of the module of FIGS. 1 and 2.
Figure 4:
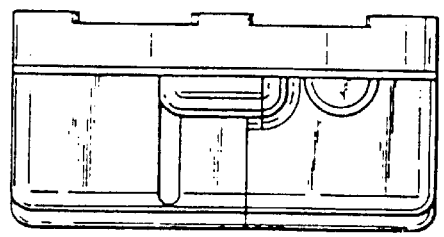
Figure 5A:
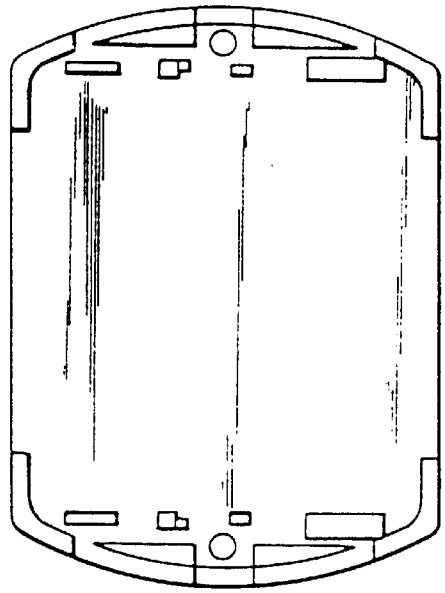
Figure 5B:
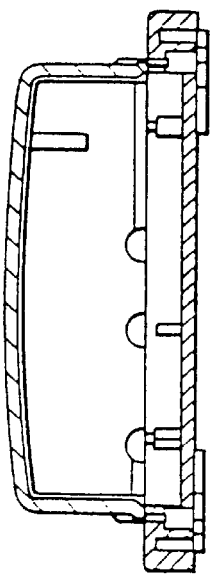
Figure 6A:
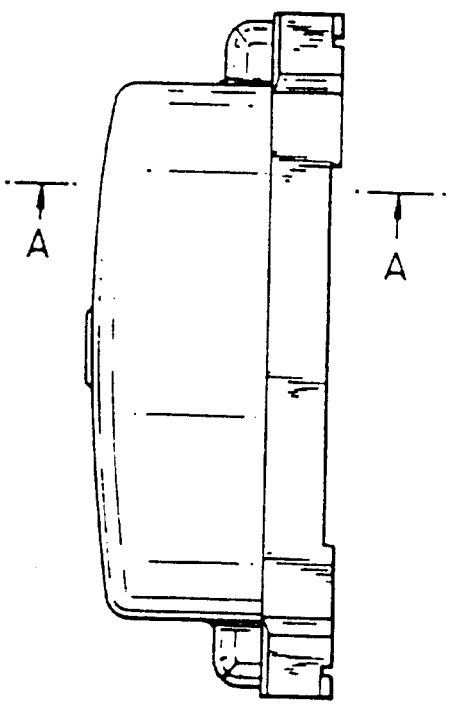
Figure 6B:
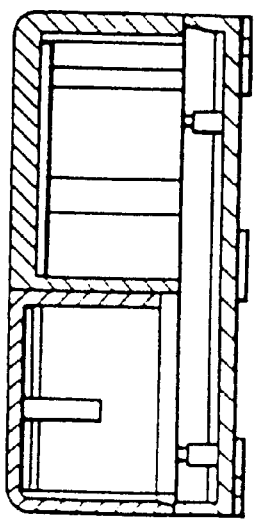

In FIG. 2 the removable cover 3 is shown partially removed. The cover 3 has fixing means 4a which allow it to be slid or rotated with respect to the first cover 2. For example means 4 may slide within a channel 5 of cover 2. In the embodiment illustrated the means 4, when cover 3 is closed, protects screw holes 6 by means of which the base 1 may be secured to a wall.

A gel material may be provided within means 4 and also around the periphery of the base or around the periphery of each cover in order that the module may be properly sealed when the covers are closed.

Various sectional views are shown in FIGS. 3 to 6.

Figure 7:
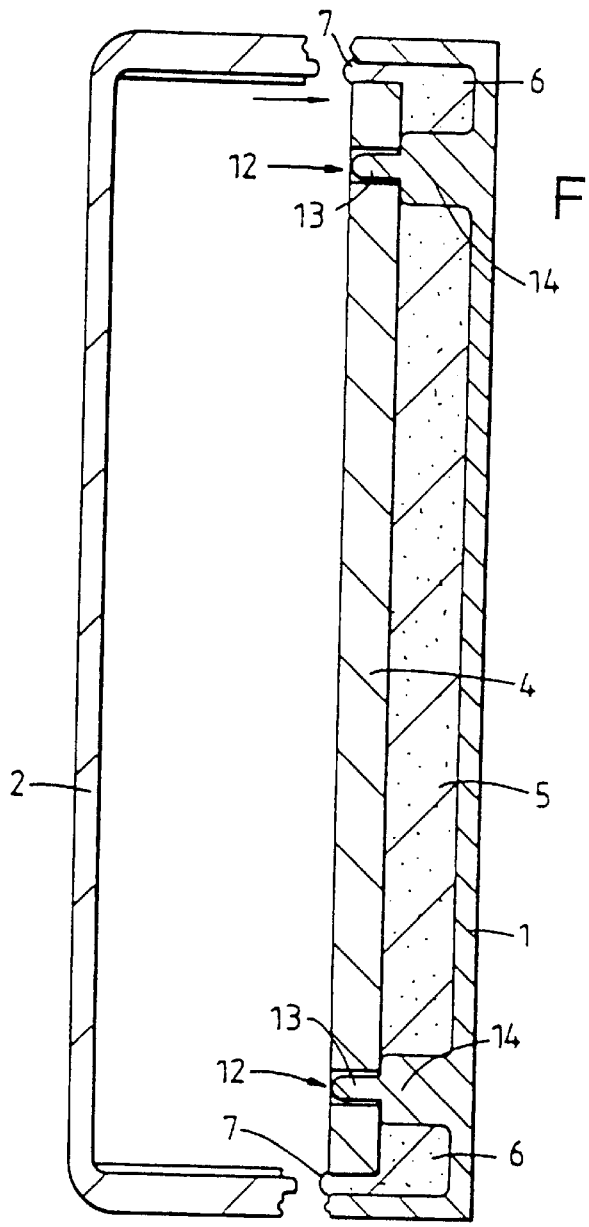

In FIG. 7 the base or first housing part 1 may be seen to carry a printed circuit board (P.C.B) 4 the underside of which is sealed by means of a gel 5. Edge portions of the gel 5 at positions 6 are displaced to provide beads 7 of gel around the periphery of the PCB between the PCB and a peripheral wall of the first housing part which beads 7 can seal to the cover 2 when the cover is forced in place. It can be seen that a gel is not needed above the P.C.B where the electronic components will be positioned. As a result the volume of gel required for total sealing is reduced.

We prefer that some disconnection mechanism be provided. When the second cover 3 is opened a switch or other means may be activated to disconnect subscriber wires from wires that lead to an exchange. Thus, line testing can be carried out to the subscriber or to the exchange independently, immediately once the lid is opened.

The gel is preferably maintained under compression when the covers are closed, and such compression may result from positioning of the P.C.B. firmly in place on the cover. In FIG. 7 it can be seen that movement of the P.C.B. downwards (to the right as drawn) will place the gel 5 under compression and/or result in the beads 7 or gel being provided for sealing for the cover. The P.C.B. may be forced downwards by closing either or both of the covers.

Supports 12 for the PCB, which project from the internal surface of the base 1, each comprise a relatively narrow end portion and a relatively wide base portion between the end portion and the internal surface of the base. Each relatively narrow end portion extends into an opening in the PCB, but the PCB abuts against the relatively wide portion of each support, thereby preventing further compression of the gel between the PCB and the first housing part. It can be seen from FIG. 7 that the bead 7 around the periphery of the PCB can be contacted by the cover 2 in order to form an environmental seal for the device when the device is closed.

Figure 8:
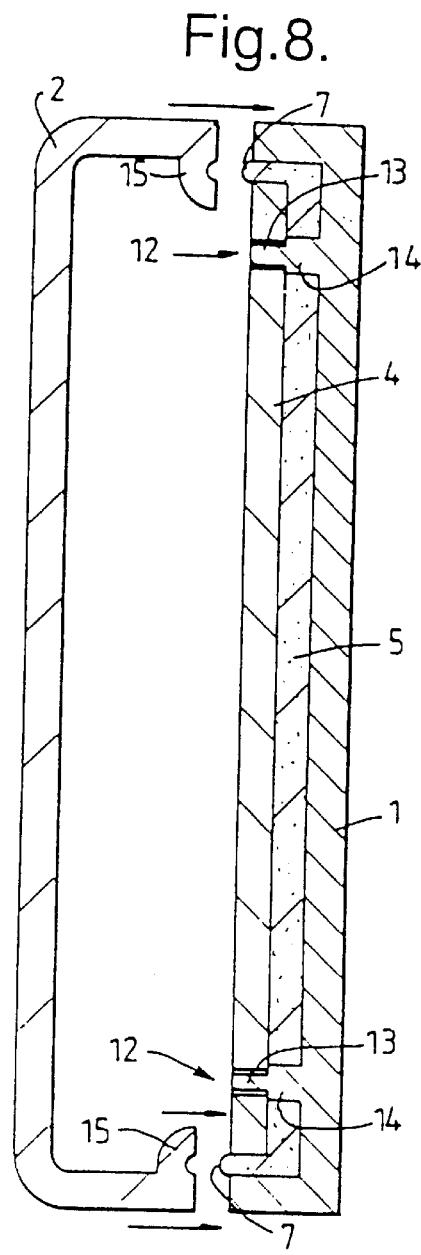

FIG. 8 shows a similar device to that of FIG. 7, but in this case the construction of the wall 15 of the cover is slightly different to that of the cover of the device of FIG. 7. In both devices, however, the cover contacts a displaced bead of sealing gel to form a seal and part of the cover contacts the PCB when the first and second housing parts are brought together, thereby automatically moving the PCB closer to the internal surface of the base (first housing part) and compressing the gel.

Figure 9A:
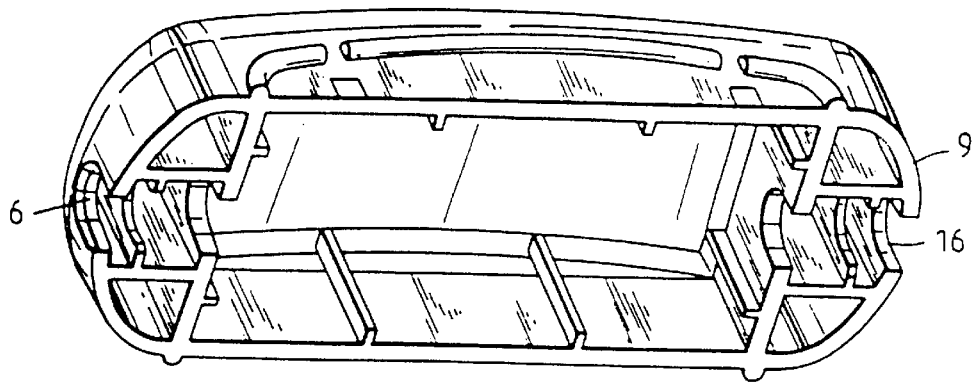
FIGS. 9 and 10 show perspective views of another form of device according to the invention.
Figure 9B:
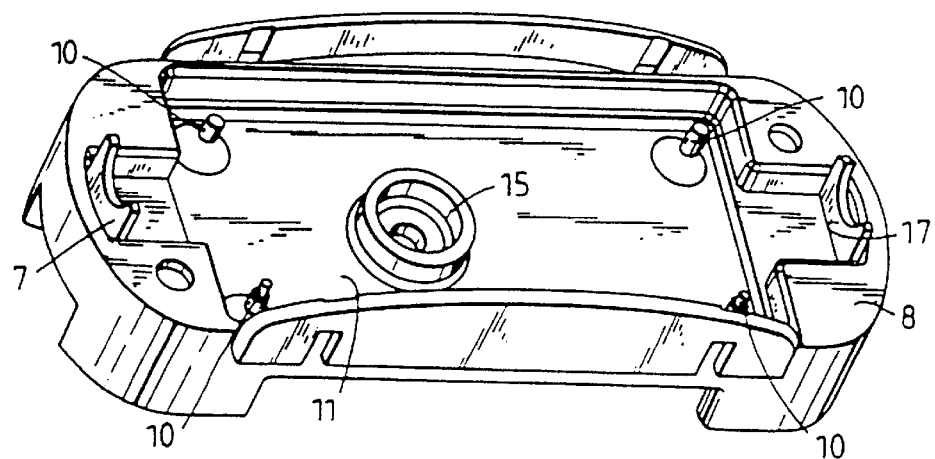

FIG. 9 shows, in perspective, another device according to the invention, which is formed as a first housing part or base 8 and a second housing part or cover 9 which may be separated (as shown) to allow access to the entire interior of the device. In this embodiment of the invention, there are four supports 10 for a printed circuit board each located generally in a corner of the rectangularly shaped base 8. As with the previously shown device, each support has a relatively narrow end portion which is shaped to extend into an opening in the circuit board and to allow some movement of the circuit board towards the internal surface 11 of the base which, in use, is provided with a layer of gel sealing material, so that the gel is compressed between the circuit board and the internal surface 11. Each support 10 also has a relatively wide portion between the narrow end portion and the internal surface of the base which is shaped to abut the circuit board to prevent further movement of the circuit board towards the base's internal surface, thereby substantially preventing over-compression of the gel.

FIG. 9 also shows an opening 15 in the base 8. This opening is for a bolt for securing the circuit board to the base 8. In addition, FIG. 9 shows openings 16 to allow a wire or cable (e.g. a telephone wire) to extend through the device, the openings being matable with semi-circular portions 17 to grip a cable or wire positioned therein in use.

Figure 10:
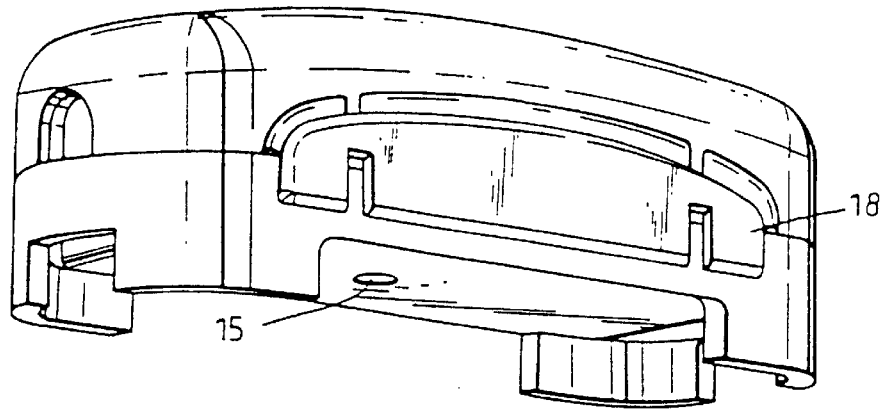

FIG. 10 shows the device of FIG. 9 closed. Side portion 18 comprises part of a latching mechanism which releasably secures the base and the cover together. The opening 15 of the circuit board for a bolt can be seen on the underside of the base.

We claim:

1. A device for environmental protection of an electrical component on a mount, which comprises:
   a first housing part;
   a second housing part which together with the first housing part defines a substantially closed housing;
   a mount for an electrical component movably secured to an inner surface of the first housing part; and
   a continuous body of sealing material positioned between the mount and the inner surface of the first housing part such that the mount is movable with respect to the first housing part to put at least portions of the body of sealing material under compression, the body of sealing material also having other portions thereof engageable by the second housing part upon engaging the second housing part with the first housing part to form the substantially closed housing.

2. A device according to claim 1, in which movement of the mount with respect to the first housing part increasingly causes displacement of the other portions of the body of sealing material to a position where it can form an improved seal between the first and second housing parts.

3. A device according to claim 2, in which the displacement of the other portions of the body of sealing material comprises formation of a bead of the body of sealing material between a wall of the first housing part and the mount.

4. A device according to claim 1, which further comprises one or more supports for the mount, which project from the inner surface of the first housing part, the one or more supports being constructed to allow the mount to be moved towards the inner surface of the first housing part to put the portions of the body of sealing material under compression.

5. A device according to claim 4, which further comprises one or more stop means to limit the movement of the mount towards the inner surface of the first housing part.

6. A device according to claim 5, in which each of the one or more supports comprises a narrow end portion which is shaped to extend into an opening formed through the mount and to allow movement of the mount with respect to the inner surface of the first housing part, and each of the one or more stop means comprises a wider portion positioned between the narrow end portion of a corresponding one of the one or more supports and the inner surface of the first housing part which is shaped to abut the mount to thereby limit movement of the mount towards the inner surface.

7. A device according to claim 1, in which the mount comprises a printed circuit board.

8. A device according to claim 1, in which movement of the mount is caused by bringing the first and second housing parts together.

9. A device according to claim 1, in which the body of sealing material comprises a gel.

10. A device for environmental protection of an electrical component on a mount, which comprises:
    a first housing part;
    a second housing part which together with the first housing part defines a substantially closed housing;
    a mount for an electrical component movably secured to an inner surface of the first housing part;
    a continuous body of sealing material positioned on the inner surface of the first housing part such that the mount is movable with respect to the first housing part to put at least portions of the body of sealing material under compression, the body of sealing material also having other portions thereof engageable by the second housing part upon engaging the second housing part with the first housing part to form the substantially closed housing;

one or more supports for the mount, said one or more supports projecting from the inner surface of the first housing part; and one or more stop means to separate the mount from the inner surface of the first housing part.

11. A device according to claim 10, in which the one or more supports are each constructed to allow the mount to be moved towards the inner surface of the first housing part, and each of the one or more stop means is constructed to limit such movement.

12. A device according to claim 11, in which the one or more supports each comprises a narrow end portion, and the one or more stop means each comprises a wider portion of the one or more supports positioned between the narrow end portion and the inner surface of the first housing part.

* * * * *